United States Patent Office 3,293,204
Patented Dec. 20, 1966

3,293,204
COMPOSITIONS CONTAINING SILANOL CHAIN-STOPPED POLYDIMETHYLSILOXONE, METHOXY-STOPPED SILOXONE COPOLYMER, AND METHYLTRIACETOXYSILANE
Clarence L. Smith, Elnora, and George P. De Zuba, Waterford, N.Y., assignors to General Electric Company, a corporation of New York
No Drawing. Filed Sept. 4, 1962, Ser. No. 221,326
1 Claim. (Cl. 260—37)

The present invention relates to certain fluid organopolysiloxane compositions curable at room temperature to the solid, elastic state. More particularly, the present invention relates to organopolysiloxane compositions comprising a silanol chain-stopped polydiorganosiloxane, an organotriacyloxysilane, and an alkoxy chain-stopped copolymer composed of organosiloxy units and diorganosiloxy units.

The development of fluid organopolysiloxane compositions curable at room temperature to the solid, elastic state, has greatly extended the utility of organopolysiloxane elastomers. These curable fluid materials are generally furnished by the manufacturer as either a one package mixture directly convertible to the solid, elastic state by exposure to moisture, or a two package mixture composed of a curing catalyst and a curable mixture which cures to the solid, elastic state after the catalyst has been incorporated.

The advantages achieved by employing the one package mixture are particularly evident in various sealing and caulking applications requiring relatively thin, cured, elastomeric sections. For example, one package organopolysiloxane mixtures convertible to the solid, elastic state at room temperature can be advantageously employed as window sealants for high altitude aircraft. It has been found however, that when the organopolysiloxane mixture is cured in contact with metal such as aluminum, the resulting rubber-metal bond is not sufficient to maintain a satisfactory cabin air pressure unless the metal has been previously primed with an organopolysiloxane resin. This procedure often proves to be unsatisfactory and time consuming, particularly where the shape of the metal substrate to be primed is irregular. As a result, the particular advantages achieved by employing fluid mixtures curable at room temperature to the solid, elastic state by exposure to moisture, are often not fully realized. In addition, the over all time needed to effect the formation of the rubber-metal bond is increased by the time needed to dry the primer before the curable organopolysiloxane mixture is applied.

The present invention is based on the discovery that a fluid composition comprising a silanol-stopped polydiorganosiloxane, a copolymer composed of organosiloxy units and diorganosiloxy units, and an organotriacyloxysilane can be applied directly to a variety of substrates including metals at room temperature, to form composites having superior bond strength between the surface of the resulting elastomer and the material treated.

In accordance with the present invention, there is provided a fluid composition comprising by weight (A) 100 parts of a silanol chain-stopped polydiorganosiloxane having the formula:

(1) 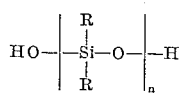

(B) 5 to 50 parts of an alkoxy-stopped copolymer composed of 5 to 60 mole percent of organosiloxy units, (2) 

chemically combined with from 95 to 40 mole percent of diorganosiloxy units, (3) 

based on the total moles of organosiloxy units and diorganosiloxy units in said alkoxy-stopped copolymer, and from 1 percent to 30 percent, by weight, of said alkoxy-stopped copolymer of chemically combined units of the formula, (4) 

(C) from 2 to 20 parts of an organotriacyloxysilane having the formula, (5)   RSi(OCOR)₃ and (D) from 10 to 300 parts of a filler, where R is a member selected from monovalent hydrocarbon radicals, halogenated monovalent hydrocarbon radicals, and cyanoalkyl radicals, R' is a lower alkyl radical, and $n$ is an integer equal to from 10 to 10,000, inclusive.

Radicals included by R of Formulae 1, 2, 3, and 5 include for example, aryl and halogenated aryl radicals, such as phenyl, tolyl, chlorophenyl, naphthyl, etc.; aralkyl such as phenylethyl, etc.; aliphatic and cycloaliphatic such as cyclohexyl, cyclobutyl, etc.; alkyl, alkenyl, and alkynyl such as methyl, ethyl, propyl, chlorobutyl, vinyl, allyl, chloroallyl, etc. Radicals included by R' of Formula 4 are for example, methyl, ethyl, propyl, butyl, octyl, etc. R and R' of the above formulae can separately be all the same radical or any two or more of the aforementioned radicals. R is preferably methyl, or phenyl and R' is preferably methyl.

The polydimethylsiloxane silanol chain-stopped polymer of Formula 1 hereinafter referred to as "silanol fluid," can have a viscosity in the range of from about 10 to 2,000,000 centipoises in viscosity when measured at 25° C. These silanol fluids can be made by treating a polydiorganosiloxane such as a polydimethylsiloxane, with water to reduce the viscosity of the polymer to within a predetermined range. Polymers that can be employed to form the silanol fluids of Formula 1 can be made in accordance with conventional equilibration procedures by heating with a base catalyst, such as potassium hydroxide, a cyclopolydiorganosiloxane having the formula:

(6) 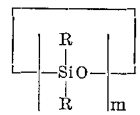

where R is as defined above, and $m$ is an integer equal to from 3 to 20, inclusive. Water is added, for example, to a high molecular weight polymer formed from a cyclic included within Formula 6, and the mixture heated to an elevated temperature for instance, 150° C. to 200° C. until a desirable viscosity is obtained such as in the range of from 10 to 2,000,000 centipoises at 25° C. The amount of water used will vary depending upon such factors as molecular weight of the polymer being treated, the time and temperature at which the mixture of polymer and water is heated, the viscosity desired, etc. Methods that can be employed to make the silanol fluids of Formula 1 are more particularly described in Patent 2,607,792 Warrick, and U.K. Patent 835,790.

The alkoxy-stopped copolymer of the present invention composed of chemically combined units shown by formulae 2, 3 and 4 can have a viscosity in the range of from 5 to 3,000 centipoises at 25° C., while a preferred viscosity is from 10 centipoises to 100 centipoises at 25° C. Preferably the alkoxy-stopped copolymer is utilized at from 15 to 40 parts per 100 parts of the silanol fluid and is composed of 10 to 30 mole percent of organosiloxy units and 90 to 70 mole percent of diorganosiloxy units. These copolymers can be made by alkoxylating with an aliphatic alcohol R'OH, a halogen chain-stopped cohydrolyzate of a diorganodihalosilane $R_2SiX_2$ and an organotrihalosilane $RSiX_3$, where R and R' are as defined above, and X is a halogen radical such as chloro.

The halogen chain-stopped cohydrolyzate can be made by agitating a mixture of the above-described organohalosilanes in the presence of an organic solvent and water at a temperature in the range of from −5° C. to 60° C. The proportion of water that can be employed during the cohydrolysis will vary in accordance with the ratio of organotrihalosilane to diorganodihalosilane utilized, and the weight percent of chemically combined halogen desired in the resulting cohydrolyzate. Experience has shown for example, that a proportion of from 0.2 mole to 0.4 mole of water per mole of hydrolyzable halogen in the halosilane mixture can be employed to provide for a satisfactory weight per cent range of halogen in the resulting halogen chain-stopped cohydrolyzate. It is preferred to form a halogen chain-stopped cohydrolyzate having from 8 percent to 30 percent by weight halogen, based on the weight of the halogen chain-stopped cohydrolyzate. Organic solvents that can be utilized during the cohydrolysis are for example, acetone, toluene, p-dioxane, etc. After the cohydrolysis is completed, the solvent and volatiles can be stripped from the mixture under reduced pressure.

In forming the alkoxy-stopped copolymer, a suitable alkanol, such as a lower aliphatic alcohol, for example, methanol, ethanol, propanol, octanol, etc. can be utilized in a proportion of from 1 to 10 moles of alcohol, per mole of hydrolyzable halide, in the halogen chain-stopped cohydrolyzate. The moles of halogen in the halogen chain-stopped cohydrolyzate can readily be determined by calculating the halogen content of the cohydrolyzate by standard titration methods. The alkanol can be added to the cohydrolyzate at a rate sufficient to maintain the temperature below 70° C., while the mixture is stirred. After about an hour's time, the separation of the alkoxy-stopped copolymer can be effected. The product can then be neutralized with alkali bicarbonate such as sodium bicarbonate, with stirring. The final alkoxy-stopped copolymer can be obtained by vacuum stripping the mixture to remove volatiles.

The organotriacyloxysilane of Formula 5 referred to below as the "silane" can be made by conventional procedures such as reacting an organotrihalosilane, and an acyl acid anhydride as shown in C. Eaborn, Organosilicon Compounds, Butterworth's Scientific Publications, London (1960) on page 312. For example, a mixture of methyltrichlorosilane and acetic anhydride is formed and allowed to stand for an extended period of time, or refluxed for a few hours. The silane can then be recovered by distilling off the resulting acyl halide.

Various fillers can be incorporated in the fluid compositions of the present invention. Among such fillers are for instance, titanium dioxide, zirconium silicate, silica aerogel, iron oxide, diatomaceous earth, fume silica, precipitated silica, glass fibers, etc. The amounts of filler used can obviously be varied within wide limits in accordance with the intended use. For instance, from about 10 to about 300 percent, by weight of the filler, based on the weight of the fluid composition can be employed. The exact amount of filler used will depend upon such factors as, for instance, the application with which the deformable mixture is intended, the type of filler employed (i.e., density of the filler), etc.

In addition, the fluid compositions of the present invention can also contain curing accelerators such as dibutyltindilaurate, carboxylic acids, salts of lead, zinc, etc.

In the practice of the invention, the room temperature curable fluid composition is made by forming a mixture of the silanol fluid, the alkoxy copolymer and the silane along with filler, etc. In forming the mixture, the order of addition of the various ingredients is not critical; it is preferred, however, to add the silane to the silanol fluid or a mixture of the silanol fluid with one or more of the aforementioned ingredients.

A preferred method of making the fluid composition is to mix the various ingredients in a substantially anhydrous atmosphere, i.e., an anhydrous inert gas such as nitrogen can be employed to minimize the introduction of moisture into the mixture. In forming the fluid composition, optimum results are obtained if the ingredients to which the silane is added have no more than 100 parts of water per million parts of ingredients.

After the fluid composition has been formed it can be stored for a substantial period of time if it is properly sealed from atmospheric moisture. If the fluid mixture is stored under sealed conditions at temperatures between 0° C. to 60° C., it will remain in a fluid curable state for a period of 6 months or more.

In order that those skilled in the art will be better able to practice the invention, the following examples are given by way of illustration and not by way of limitation. All parts are by weight.

Example 1

A fluid composition of the present invention was made by mixing under an atmosphere of anhydrous nitrogen, 100 parts of a silanol fluid, 25 parts of fume silica, 30 parts of a methoxy-stopped copolymer, 8 parts of methyltriacetoxy silane, and .01 part of dibutyltindilaurate. The methoxy-stopped copolymer was composed of chemically combined methylsiloxy units and dimethylsiloxy units and had a viscosity of 28 centipoises at 25° C. It contained 9.3% by weight of methoxy radicals based on the weight of the copolymer, and approximately 16.2 mole percent of methylsiloxy units chemically combined with 83.8 mole percent of dimethylsiloxy units based on the total moles of methylsiloxy units and dimethylsiloxy units in the copolymer.

The silanol fluid had a viscosity of about 3,000 centipoises at 25° C., and was made by heating a mixture of about 100 parts of octamethylcyclotetrasiloxane and about 0.01% based on the weight of the mixture of potassium hydroxide to a temperature of between 110° C. to about 150° C. When the viscosity of the mixture was in the soft gum range, water was added in increments until the viscosity was in the desired range.

The methoxy-stopped copolymer was made by forming a mixture of 8.25 moles of dimethyldichlorosilane, and 1.60 moles of methyltrichlorosilane. To the mixture there was added with stirring, a mixture of 7.22 moles of water, and 4.32 moles of acetone. The cohydrolysis was conducted at a temperature between 10° C. to 20° C. After 3 hours, the cohydrolyzate was stripped. Analysis showed that the product contained 13% by weight chlorine.

To the cohydrolyzate there was added methanol in a proportion of 8 moles of methanol per mole of chloride in the cohydrolyzate. The mixture was stirred 30 minutes while the temperature was maintained at a temperature of about 50° C. The product was separated, neutralized with sodium bicarbonate and then vacuum stripped.

A portion of the fluid composition above was poured onto an aluminum substrate. It was exposed to atmospheric conditions for about 48 hours at a temperature of 25° C. Another portion was poured into a mold to form a test slab. It also was allowed to cure for 48 hours.

*Example 2*

A fluid composition was prepared in accordance with the procedure of Example 1, except there was utilized 10 parts of methoxy-stopped copolymer having 50 mole percent of chemically combined methylsiloxy units. This fluid composition was also poured into an aluminum substrate, and formed into a test slab as in Example 1.

*Example 3*

A fluid composition was prepared following the procedure of Example 1, composed of 100 parts of the silanol-stopped polydimethylsiloxane, 36 parts of fume silica, 14 parts of methyltriacetoxysilane, and 43 parts of a methoxy-stopped copolymer. This methoxy-stopped copolymer was composed of 10 mole percent of methylsiloxy units chemically combined with 90 mole percent of dimethylsiloxy units. A portion of this fluid composition was poured onto an aluminum sheet and allowed to cure for 48 hours at 25° C. A cured test slab was also prepared by exposing the fluid mixture to the atmosphere for 48 hours at 25° C.

Fluid compositions of the prior art were also prepared in accordance with the teaching of U.K. Patent 791,370, and Example 11 of Patent 3,035,016, Bruner. The fluid mixture which was prepared in accordance with the U.K. patent comprised 100 parts of the silanol fluid of Example 1 above, 20 parts of fume silica and 5 parts of methyltriacetoxysilane. The mixtures prepared in accordance with the Bruner and U.K. patent were also contacted to an aluminum substrate following the above procedure. In addition, the mixture prepared in accordance with the U.K. patent was also contacted to an aluminum substrate that had been primed with an organopolysiloxane resin, of the type shown in Patent 2,643,964, Smith-Johannsen.

The table below shows the results obtained with the fluid composition of Example 1 of the present invention, referred to as "methoxycopolymer," as compared to compositions free of the methoxy-stopped copolymer, such as taught in Bruner and the above-mentioned U.K. patent. The results obtained with the compositions of Example 2 and 3 of the present invention were substantially equivalent to those shown below in the table for the U.K. composition that had been primed.

In the table, "Shear Strength" (p.s.i.) and "Peel Strength" (p.s.i.) were measured on a Tinius-Olson tester at a rate of 0.5 inch per minute. In measuring shear, the fluid was spread on an aluminum panel to a height of about 0.02 inch, and a section of wire mesh screen was imbedded in the compound, and then covered with the fluid mixture to a height of about 0.02 inch. After the fluid mixture cured, the aluminum strip and the screen were then pulled in opposite directions at a predetermined rate. Peel strength measures the force required to peel the cured elastomer from the aluminum strip. In the instance where a primed aluminum strip was used, the primer was allowed to dry in air. In the table "H" (hardness) is measured in Shore A, "T" (tensile) p.s.i., and "E" (elongation) is in percent.

TABLE

| | Shear Strength | Peel Strength | 48 Hrs./25° C. | | |
|---|---|---|---|---|---|
| | | | H | T | E |
| Methoxycopolymer | 157 | 20-25 | 37 | 375 | 380 |
| Bruner | 87 | 1-6 | | | |
| U.K. | 66 | 0.5 | 45 | 348 | 270 |
| U.K.+Primer | 130 | 10-11 | | | |

One skilled in the art would know that the fluid compositions of the present invention represent a significant advance over those shown in the prior art. For example, the fluid compositions free of the methoxy-stopped copolymer cannot be utilized in a variety of sealant applications without the employment of a primer. The advantages achieved by the fluid compositions of the present invention provide for significant advantages in applications requiring a material possessing the properties of organopolysiloxanes curable at room temperature which bonds to a variety of substrates without the employment of a primer.

While the foregoing examples have of necessity been limited to only a few of the very many variables within the scope of the present invention, it should be understood the present invention covers a much broader class of fluid compositions containing the silanol-stopped polymers of Formula 1, the alkoxy-stopped copolymer included by Formulae 2, 3 and 4 and the organoacyloxysilane shown in Formula 5. All of these materials are prepared by methods specifically illustrated in the examples above and described further in the foregoing description of the present invention.

What we claim as new and desire to secure by Letters Patent of the United States is:

A substantially anhydrous fluid composition comprising by weight, (1) 100 parts of a silanol chain-stopped polydimethylsiloxane having the formula

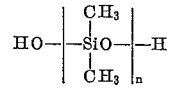

(2) from 15 to 40 parts of a methoxy-stopped copolymer of 10 to 30 mole percent of methylsiloxy units and 90 to 70 mole percent of dimethylsiloxy units, based on moles of methylsiloxy units and dimethylsiloxy units, (3) from 2 to 20 parts of methyltriacetoxysilane, and (4) from 10 to 300 parts of a filler, where $n$ is an integer equal to from 10 to 10,000, inclusive.

References Cited by the Examiner

UNITED STATES PATENTS 3,035,016   5/1962   Bruner _____ 260—37
3,065,194   11/1962  Nitzsche _____ 260—37

OTHER REFERENCES

Brimley, K. J.: Some Recent Developments in Silicone Rubbers, in Institution of The Rubber Industry, vol. 9, p. 39, April 1962.

MORRIS LIEBMAN, *Primary Examiner.*

J. W. BEHRINGER, J. H. DERRINGTON,
*Assistant Examiners.*